United States Patent
Pellenc et al.

(10) Patent No.: US 8,069,641 B2
(45) Date of Patent: Dec. 6, 2011

(54) HARVESTING MACHINE FOR SMALL FRUIT PRODUCED IN ORCHARDS

(75) Inventors: Roger Pellenc, Pertuis (FR); Jean-Marc Gialis, Cheval Blanc (FR); Christian Rolland, Cucuron (FR)

(73) Assignee: Pellenc (Societe Anonyme), Pertuis (FR)

( * ) Notice: Subject to any disclaimer, the term of this patent is extended or adjusted under 35 U.S.C. 154(b) by 9 days.

(21) Appl. No.: 12/629,720

(22) Filed: Dec. 2, 2009

(65) Prior Publication Data

US 2010/0139234 A1 Jun. 10, 2010

(30) Foreign Application Priority Data

Dec. 10, 2008 (FR) ...................................... 08 06915

(51) Int. Cl.
*A01D 46/00* (2006.01)
(52) U.S. Cl. .......................................... 56/328.1; 56/330
(58) Field of Classification Search ................. 56/328.1, 56/330, 327.1, 340.1, DIG. 19
See application file for complete search history.

(56) References Cited

U.S. PATENT DOCUMENTS

| | | | | |
|---|---|---|---|---|
| 3,727,388 A * | 4/1973 | Smith | ............................. | 56/330 |
| 3,931,660 A * | 1/1976 | Capra | ............................. | 15/53.3 |
| 4,014,160 A * | 3/1977 | Mecca | ............................. | 56/330 |
| 4,022,001 A * | 5/1977 | Burton | ............................. | 56/330 |
| 4,039,014 A * | 8/1977 | Sellars | ............................. | 15/53.3 |
| 4,236,371 A * | 12/1980 | Claxton | ............................. | 56/330 |
| 4,321,786 A * | 3/1982 | Burton | ............................. | 56/330 |
| 4,418,521 A * | 12/1983 | Orlando et al. | ................. | 56/330 |
| 4,750,322 A | 6/1988 | Korthuis | | |
| 4,754,515 A * | 7/1988 | Ennis et al. | ..................... | 15/53.3 |
| 4,793,128 A * | 12/1988 | Creed | ............................. | 56/330 |
| 4,974,404 A * | 12/1990 | Korthuis et al. | ................ | 56/330 |
| 5,355,667 A * | 10/1994 | Scott | ............................. | 56/330 |
| 5,495,708 A * | 3/1996 | Scott et al. | ....................... | 56/329 |
| 5,647,194 A * | 7/1997 | Scott et al. | ................... | 56/328.1 |
| 5,921,074 A * | 7/1999 | Scott et al. | ....................... | 56/330 |
| 5,946,896 A * | 9/1999 | Daniels | ......................... | 56/328.1 |
| 5,956,933 A * | 9/1999 | Heard | ............................. | 56/329 |
| 6,145,291 A * | 11/2000 | Jarmain | ......................... | 56/330 |
| 6,378,282 B1 * | 4/2002 | Carlton | ............................. | 56/330 |
| 6,484,487 B1 * | 11/2002 | Buist et al. | ....................... | 56/330 |
| 7,500,342 B2 * | 3/2009 | Merant et al. | ................... | 56/330 |
| 2005/0000204 A1 * | 1/2005 | Scott | ............................. | 56/330 |

FOREIGN PATENT DOCUMENTS

| | | |
|---|---|---|
| EP | 0368773 | 5/1990 |
| WO | 9715182 | 5/1997 |
| WO | 9747176 | 12/1997 |
| WO | 0219794 | 3/2002 |

* cited by examiner

*Primary Examiner* — Arpad Fabian-Kovacs
(74) *Attorney, Agent, or Firm* — Egbert Law Offices PLLC

(57) ABSTRACT

A shaking system for a harvesting head used in picking fruit from orchards has a fruit separating assembly with a lower subassembly and an upper subassembly. The upper subassembly is positioned rearwardly of said lower subassembly at a higher level than the lower subassembly. First and second oscillating drive shafts are independently and drivingly connected to the respective first and second subassemblies.

6 Claims, 5 Drawing Sheets

HARVESTING MACHINE FOR SMALL FRUIT PRODUCED IN ORCHARDS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a harvesting machine for small fruit produced in orchards, especially in olive groves, for the harvesting or picking of olives. More precisely, the invention is attached to the picking head of this machine.

2. Description of Related Art Including Information Disclosed Under 37 CFR 1.97 and 37 CFR 1.98.

Grape picking machines are known which feature a picking head which includes a shaking system consisting of two berry detaching assemblies mounted opposite to each other and containing each a number of stacked shakers consisting for example of small flexible bars, fastened, by the intermediary of their ends, to two vertical shafts of which at least one is an oscillating actuation shaft linked to a shaking control imparting an oscillating movement to it.

There are also grape picking machines with two shaking systems placed one after the other, at the same height, in order to increase efficiency with respect to the dropping rate of the grapes. This configuration, however, causes many vine branches to break because of the repetitious strikes in the same area and creates balancing problems so that the results are unsatisfactory.

Certain manufacturers of equipment for the olive-oil industry have proposed to raise the height of the shaking assemblies of the classic fruit picking machines to adapt it to the height of olive trees.

However, increasing the height of the harvesting system has its limits, as it does not permit by itself to resolve the particular problems associated with the harvesting of small fruit grown on fruit trees and bushes of great height and laid out in line, especially in olive-groves.

One of these problems is the necessarily reduced clearance height of the straddling carrier, i.e., the clearance height under the chassis of the latter (generally in the range of 2.2 m corresponding to a shaking height in the range of 1.8 m behind which the actual harvesting machine is mounted or hitched up. To alleviate this problem, the olive growers keep olive hedge-rows fairly low so as to be able to straddle them, which has the drawback of limiting the yield of trees grown with a reduced height.

The second problem derives from the manufacture of shaking systems with a large number of stacked picking arm pairs (a dozen of stacked picking arm pairs is considered to be the maximum). The drawback of such a design is to cause unbearable vibrations for the driver of the machine, these vibrations being also detrimental to the reliability of the shaking system because of the overload of picking arms mounted on a single oscillating shaft.

One goal of the invention is to solve the problems posed by harvesting machines of small fruit, olives in particular, primarily noteworthy for an increase in the height of the shaking systems of the classic harvesting machines.

BRIEF SUMMARY OF THE INVENTION

According to the invention, this objective has been achieved owing to a machine featuring a picking head which includes a shaking system including two fruit detaching assemblies mounted opposite to each other and separated by a vertical space. These assemblies featuring each a number of stacked shakers, for instance formed by flexible bars, fastened, by the intermediary of their ends, to two vertical shafts, of which at least one is an oscillating actuation shaft linked to a shaking control imparting an oscillating movement to it. This shaking system being noteworthy primarily in that each of its vertical fruit detaching assemblies includes two sub-assemblies, namely first a lower sub-assembly and second an upper sub-assembly that is offset towards the back in relation to said lower sub-assembly and in the forward travel of the machine in operation, each sub-assembly of stacked picking arms being driven by its own oscillating drive shaft.

This shaking system provides several advantages:

it allows distributing the picking arms of each shaking assembly over two distinct drive shafts which solves the problem of constraints that arise from driving a large number of picking arms by a single oscillating shaft.

It permits solving the problem of trees (olive-trees for example) or of bushes bending forward in order to pass under the arch of the chassis of the straddling tractor; so that at first the picking arms of the lower sub-assemblies efficiently shake the lower part of the tree, then the tree straightens up after having passed under the arch and it becomes the turn of the picking arms of the upper sub-assemblies to shake efficiently the upper area of the tree which in this manner finds itself completely harvested, in two strokes.

It allows to considerably increase the height of the shaking system and of the number of picking arms (for example, 28 pairs of picking arms, distributed over a height of 3.40 m).

According to an advantageous method of execution, the vertical activation shafts of the picking arms of the lower and upper sub-assemblies respectively which define two shaking zones in front and in back, are separated by a distance which is essentially equal to the planting distance between the fruit trees. More precisely, the offset between the activation shafts of the lower and upper sub-assemblies is essentially equal to the length of the shaking zones defined by said sub-assemblies. This characteristic arrangement prevents the tree from being sheared, considering the fact that one tree is always engaged whereby it is possible to smooth out the load on the shaking motor and its mechanism. In this manner the shaking actions generated by the shaking units or the pairs of upper and lower shaking sub-assemblies are applied successively on each fruit tree to be harvested, and not simultaneously.

According to another interesting method of execution, the stacked picking arms of the lower sub-assemblies and the stacked picking arms of the upper sub-assemblies are operated in opposition which means that when the picking arms of the lower sub-assemblies move in one direction, the picking arms of the upper sub-assemblies move in the opposite direction. This arrangement allows a considerable reduction of the vibrations which offers, besides, the possibility of using the straddling tractors currently used in wine-growing.

According to a preferred method of execution, the pair of lower sub-assemblies or lower shaking unit and the pair of upper sub-assemblies or upper shaking unit have essentially the same height and preferably feature the same number of picking arms. The level of separation between the lower unit or pair of sub-assemblies and the upper unit or pair of sub-assemblies is configured at mid-height or approximately at mid-height of the total height of the shaking assemblies.

According to another characteristic arrangement, the means of activation, in opposing direction, of the lower and upper shaking units, or lower and upper pairs of shaking sub-assemblies include a rotary shaft on which are mounted two eccentrics diametrically opposed to the level of their excentration, each of these eccentrics being linked, through the intermediary of a first connecting rod to a first pivoting assembly attached to the oscillating activation shaft of an upper rear subassembly, this first pivoting assembly being itself linked by means of a second connecting rod to a second pivoting assembly attached to the oscillating activation shaft of the lower front shaking sub-assembly.

BRIEF DESCRIPTION OF THE SEVERAL VIEWS OF THE DRAWINGS

The above aims, characteristics and advantages and still more, will become clearer from the following description and the attached drawings in which.

Figure 1:
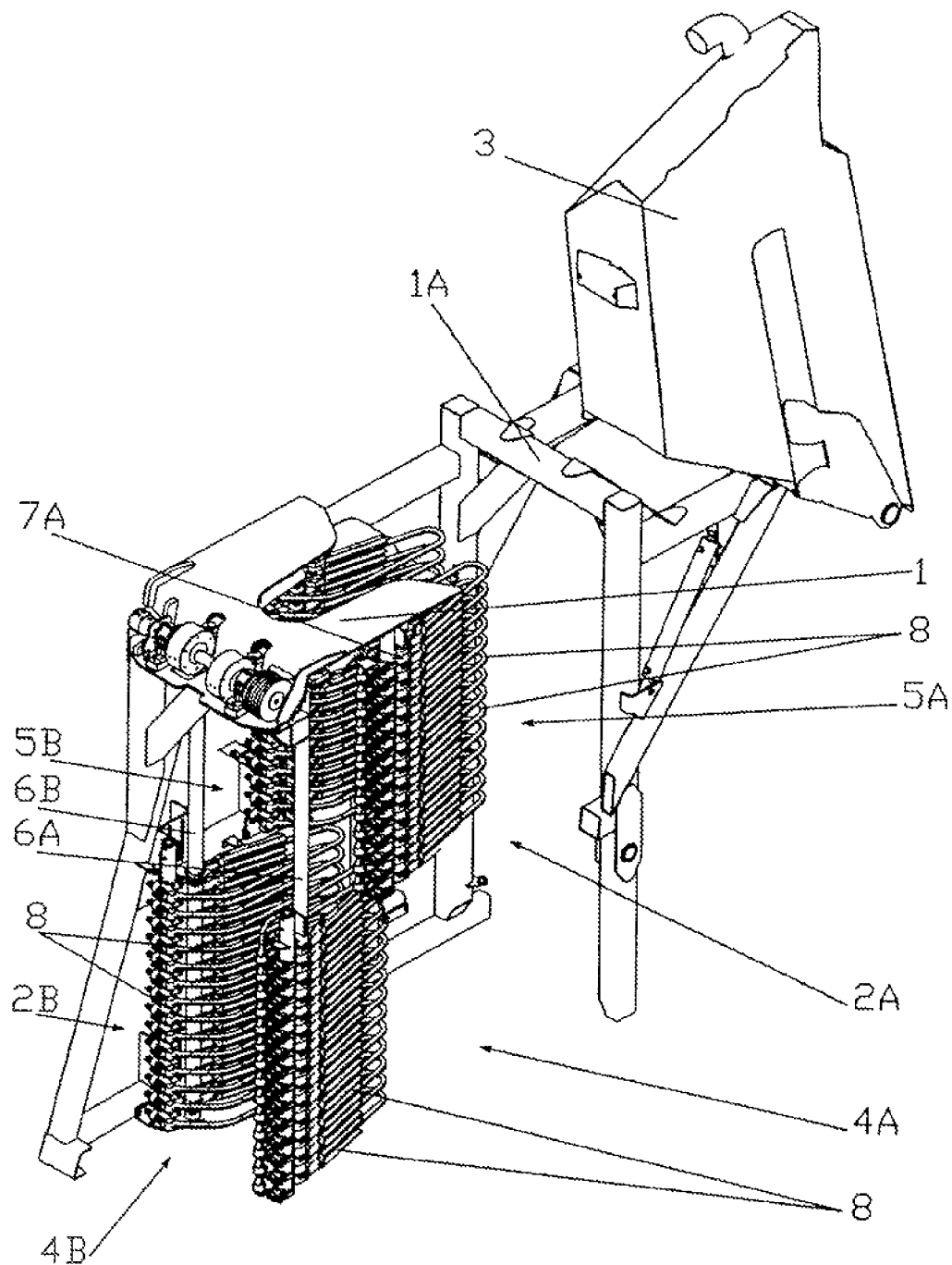
FIG. 1 is a perspective schematic view of a harvesting head shaking system in accordance with the invention.

Reference is made to said drawings to describe an interesting, although by no means limiting, example of execution of the small fruit harvesting machine according to the invention, and, more specifically, of the harvesting head of the latter.

DETAILED DESCRIPTION OF THE INVENTION

The harvesting head of small fruit according to the invention (shown in a simplified manner on the attached drawings) comprises, in similar fashion to the grape harvesting machines, a frame 1 in the form of an arch and supporting in particular on the one hand a shaking system constituted by two detaching assemblies of the fruit 2A, 2B, mounted opposite each other and separated by a vertical space and, on the other hand, two conveying systems (not shown) for the receiving and transportation of the harvest to two receiving bins 3 installed laterally and in the high portion of the frame 1A of the machine. The latter [frame] may be equipped with wheels (not shown) and the machine is motorized and has regulating systems (also not shown) enabling, respectively, the drive and the control of the operation of its active mechanisms. Such a machine may be self-propelled or may be mounted in non-permanent fashion on a straddling stilt carrier or drawn by a tractor.

According to an important characteristic arrangement of the invention, each fruit detaching assembly 2A, 2B includes two sub-assemblies, namely, respectively, a first lower sub-assembly 4A or 4B and a second upper sub-assembly 5a or 5B offset towards the back relative to said first lower sub-assembly 4A or 4B and in the forward direction of the machine in operation (indicated by the arrow F on the figures of the drawings). This offset is designated by the reference X on the drawings.

Thus, the shaking systems comprise:

a lower shaking unit comprising the pair of lower sub-assemblies 4A, 4B;

an upper shaking unit comprising the pair of upper sub-assemblies 5A, 5B, said upper shaking unit 5A-5B being arranged in an offset manner towards the rear relative to the lower shaking unit 4A-4B.

Each shaking sub-assembly 4A, 4B, 5A, 5B is operated by its own an oscillating shaft. The lower shaking sub-assembly 4A is operated by a vertical oscillating shaft 6A. The lower shaking sub-assembly 4B is operated by an oscillating shaft 6B; the upper shaking sub-assembly 5A is operated by a vertical oscillating shaft 7A, whereas the upper shaking sub-assembly 5B is driven by an oscillating shaft 7B.

According to an advantageous method of execution, each shaking sub-assembly 4A, 4B, 5A, 5B is constituted by a number of picking arms or stacked shakers 8. These vertically spaced shakers comprise, for instance, of flexible bars that are fixed, through the intermediary of their ends, on the one hand to a first vertical shaft 6A, 6B, 7A or 7B which is mounted with an oscillation capability, around its longitudinal axis, on the frame 1 of the shaking system, and, on the other hand, to a second vertical shaft 9A, 9B, 10A or 10B which is preferably fixed, relative to frame 1, but which could be installed with a motorized oscillating capability, or as running idle. Preferably, the stacked shakers 8 of each shaking assembly 4A, 5A are slightly offset vertically relative to the shakers of the other shaking sub-assembly 4B, 5B respectively, mounted opposite.

Advantageously, the shakers 8 have the general shape of a hairpin including two slightly divergent legs 8a, 8b, connected to each other by a curved portion, the end of one of these branches or driving branch 8a being linked to an activation shaft (shafts 6A, 6B, 7A, 7B), whereas the end of the other (8b) of said branches constituting the active branch of the shaker being attached to a fixed support (shafts 9A, 9B, 10A, 10B). These flexible shakers are made of a semi-rigid material, for example of polyamide or another material with similar characteristics of flexibility and resistance to deflection (for instance: polyester, glass fiber, etc.).

The active branch 8b of these shakers 8 has a length greater than that of the driving branch 8a and it has one end-portion that is curved in the direction of the axis of said actuation branch.

According to an advantageous method of execution, the vertical driving shafts 6A, 7A, and 6B, 7B of the picking arms of the lower sub-assemblies 4A, 4B, and of the upper ones 5A, 5B, respectively, which define two shaking areas (low front shaking area and high rear shaking area), are separated by a distance X which is preferably about equal to the planting distance between the fruit trees. More specifically, the offset X between the driving shafts of the lower and upper sub-assemblies, is essentially equal to the length of the front and rear shaking areas defined by said sub-assemblies.

According to another interesting method of execution, the stacked picking arms of the lower sub-assemblies and the stacked picking arms of the upper sub-assemblies are activated opposite to each other which mean that when the picking arms of the lower sub-assemblies move in one direction, the picking arms of the upper sub-assemblies move in the opposite direction.

According to a preferred method of execution, the level of separation between the lower front unit or pair of sub-assemblies 4A-4B and the upper rear unit or pair of sub-assemblies 5A-5B is provided at mid-height or essentially at mid-height of the complete height of the shaking assemblies 4A-5A or 4B-5B.

Figure 5:
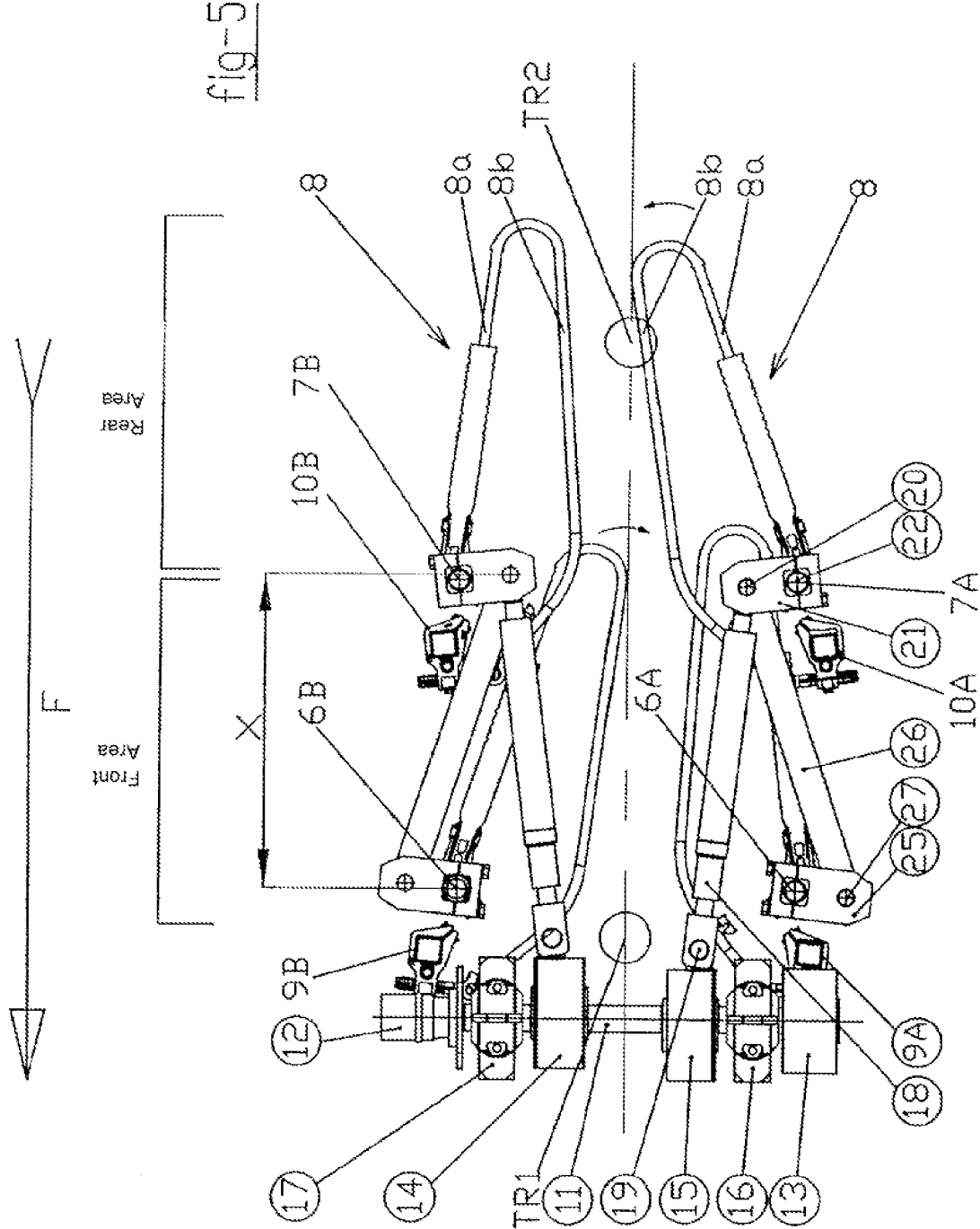
FIG. 5 is a plan view of the activation mechanism of the picking arms of the lower and upper shaking units of the harvesting head.

FIG. 5 illustrates an interesting mode of configuration of the drive mechanisms of the oscillating shafts 6A, 7A, 6B, 7B which permits the application of this characteristic arrangement. In this figure, the references TR1 and TR2 represent trunks of fruit trees such as olive-trees.

These drive mechanisms comprise a horizontal shaft 11 mounted at the upper part and in front of the frame 1 of the harvesting head. This shaft 11 is put into rotary motion by a hydraulic motor 12 or by a motor of another type, coupled to one of the ends of said shaft. The opposite end of the latter is fitted with a flywheel 13 for the purpose of smoothing out the shaking load bursts.

On this rotary shaft 11 are mounted two eccentrics, i.e. aright eccentric 14 and a left eccentric 15, these eccentrics being diametrically opposed at the level of their excentration so as to constitute a cranked shaft mounted on bearings 16 and 17.

Each eccentric 14 and 15 activates a drive system of the left and right shaking assemblies 4A-5A and 4B-5B, respectively. As this drive system is the same for the left and right shaking assemblies, only the drive system of the left shaking assembly is described here.

Figure 2:
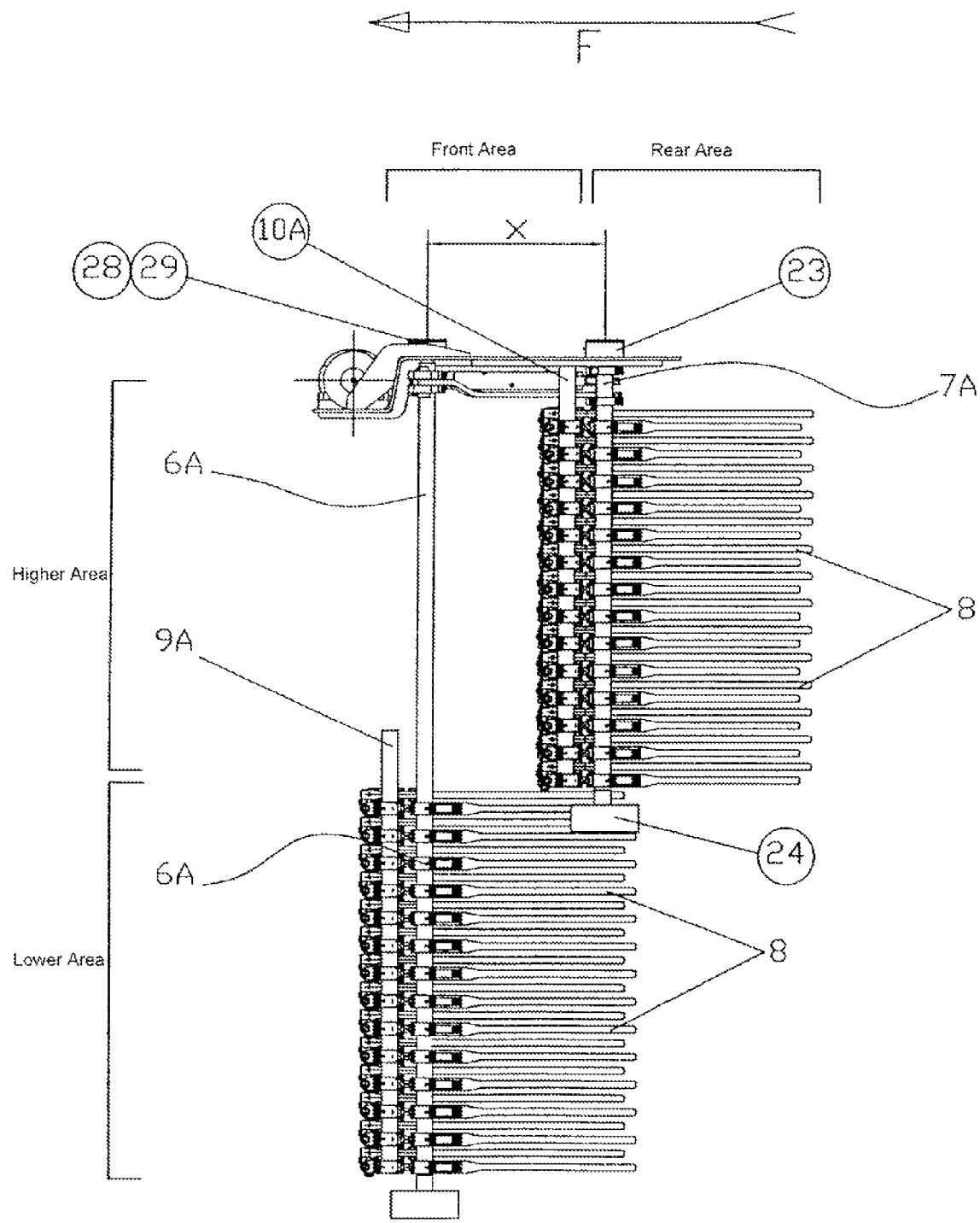
FIG. 2 is a side view of the shaking system of the present invention.

The left eccentric 15 communicates a back-and-forth movement to a connecting rod 18. This connecting rod is linked through the intermediary of one of its ends and by means of a hinge bolt 19 to the eccentric 15, and through the intermediary of its other end and by means of a hinge bolt 20 to a first pivoting assembly 21. This pivoting assembly is bolted to the oscillating shaft 7A (or 7B), equipped, at its upper end with a cylindrical pivot 22 mounted in a bearing 23 and pressed, in its lower part, into a bearing 24 (FIG. 2).

The oscillating shaft 7A is capable of receiving and activating a number of picking arms 8 (for example 14 stacked picking arms) attached by flanging, and forming together the upper left rear sub-assembly 5A. The other end of these picking arms is attached to a shaft or a fixed support 10A. The first pivoting assembly 21 serves also to drive the second pivoting assembly 25 in the opposite direction, by means of a connecting rod 26. This connecting rod 26 is linked, through the intermediary of one of its ends and by means of a hinge bolt 20, to the first pivoting assembly 21 and, through the intermediary of its opposite end and by means of a hinge bolt 27, to the second pivoting assembly 25. The second pivoting assembly 25 is fixed, for example by bolting, on the oscillating shaft 6A which is equipped, at its upper end, with a cylindrical pivot 28 mounted in a bearing 29, and in its lower part, pressed into a bearing 30.

One understands that, according to this mode of execution, when the first pivoting assembly 21 is pivoted in one direction, the second pivoting assembly 25 finds itself pivoted in the opposite direction, which results in movements of opposite direction of the picking arms of the upper rear shaking unit relative to the picking arms of the lower front shaking unit.

The oscillating shaft 6A is capable of receiving and activating a number of picking arms 8 (for example 14 stacked picking arms) attached by flanging, and forming, together, the lower left front sub-assembly 4A. The opposite end of the picking arms 8 is fixed on a support or fixed shaft 9A.

As indicated previously, the drive mechanisms of the right shaking assembly 4B-5B, from the right eccentric 14 on, are identical, so as to have a quasi parallel displacement of the picking arms 8 of the lower shaking units 4A-4B and the upper ones 5A-5B, respectively.

Figure 3:
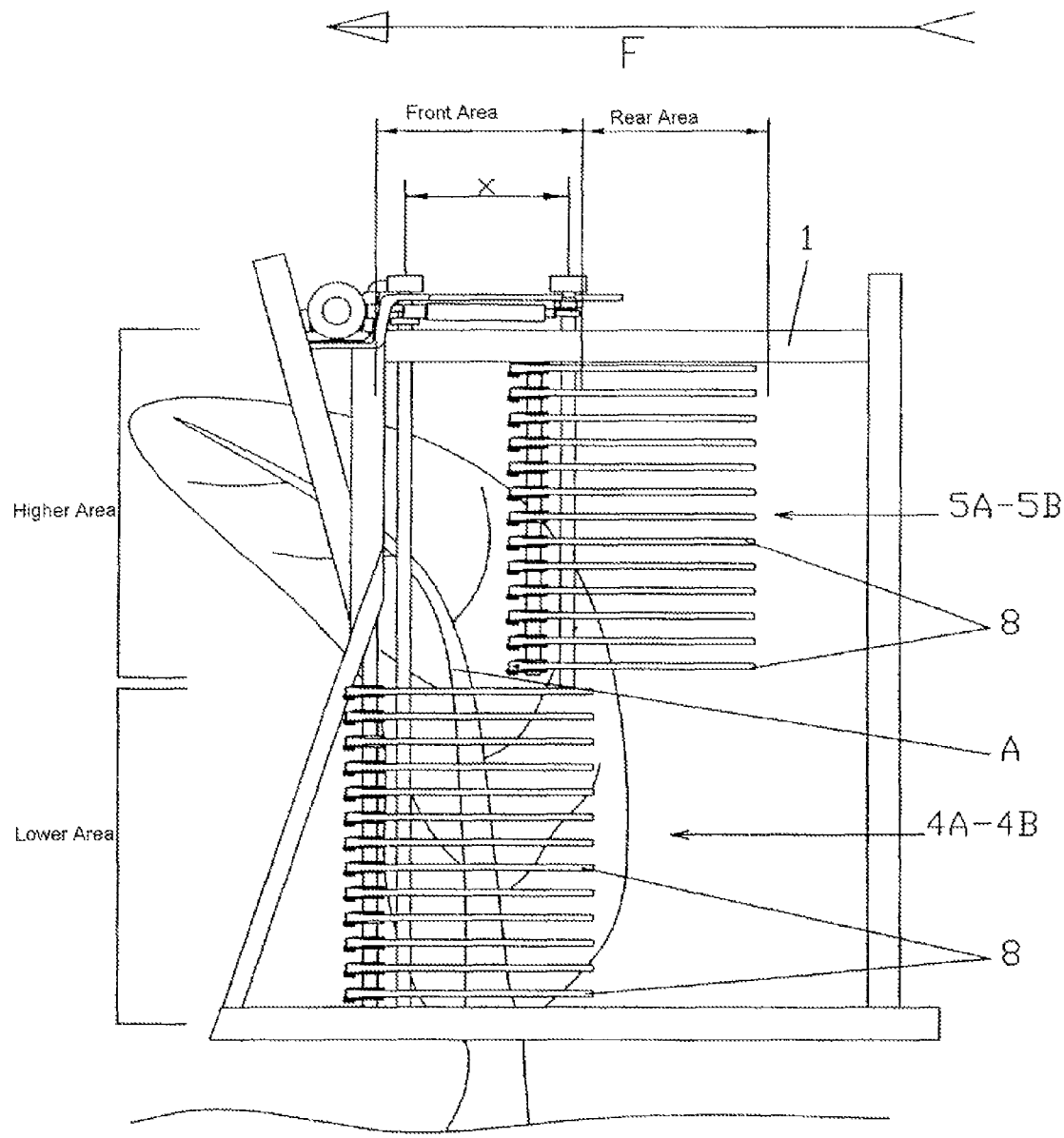
FIG. 3 is another side view of this shaking system shown while moving forward into a position where the lower shaking unit shakes the lower portion of a tree bent forward.

FIG. 3 shows the shaking system of the harvesting head while moving forward, into a position following which the lower front shaking unit 4A-4B shakes the lover part of a tree A bent forward.

Figure 4:
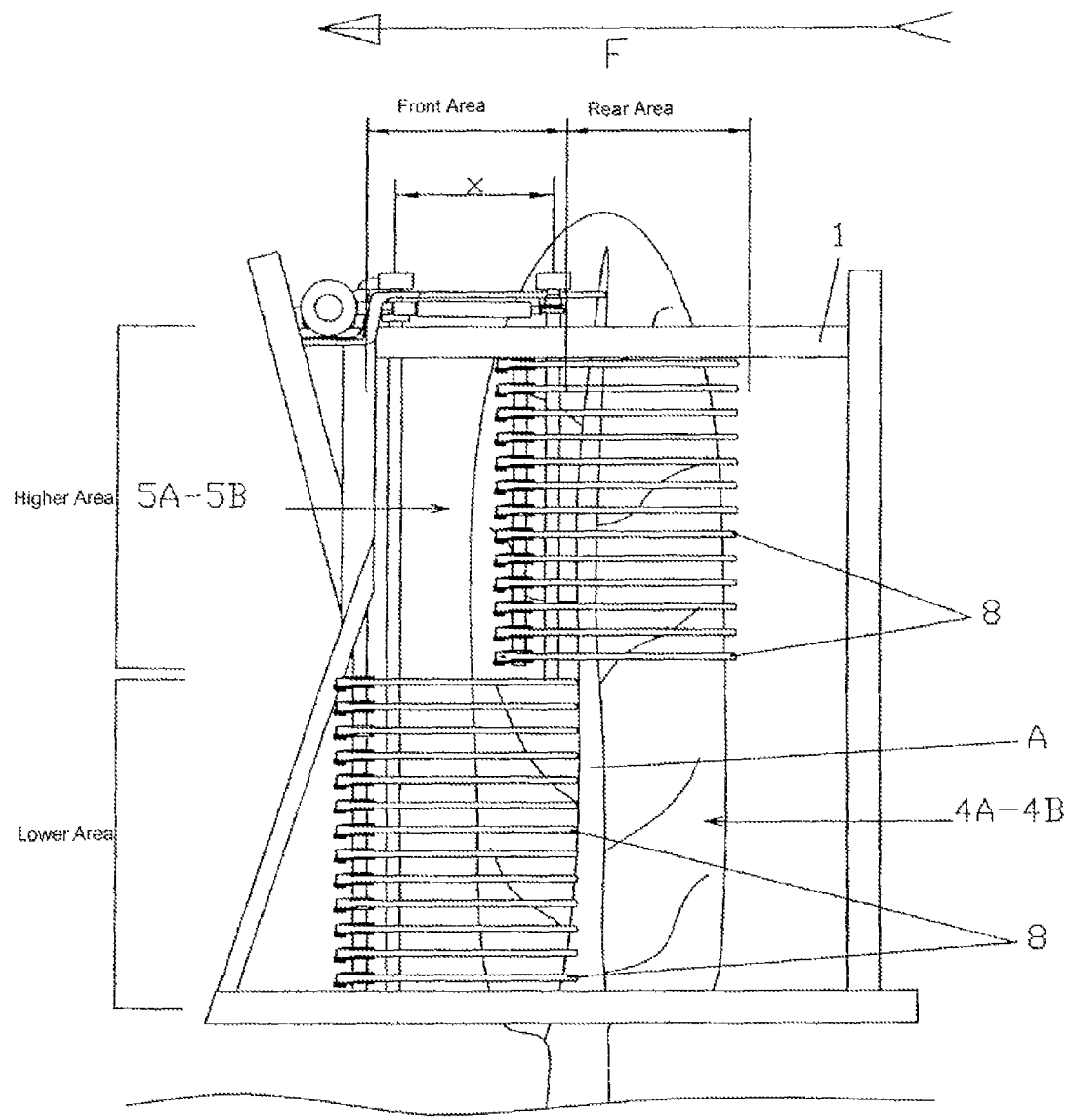
FIG. 4 is a side view analog to FIG. 3, showing the shaking system in a position where the upper shaking unit shakes the upper portion of the straightened up tree.

FIG. 4 is an analog view showing the shaking system in a position where the upper part of the straightened up tree A is shaken by the upper rear shaking unit 5A-5B of the harvesting head.

We claim:

1. A harvesting head apparatus for harvesting small fruit in fruit-bearing arboriculture, the harvesting head having a direction of forward movement during harvesting, the harvesting head apparatus comprising:
a first shaking assembly;
a second shaking assembly mounted opposite to said first shaking assembly and separated by a vertical space, each of said first and second shaking assemblies comprising:
a lower first subassembly; and
an upper second subassembly offset rearwardly of said lower first subassembly relative to the direction of forward movement, each of said lower first subassembly and said upper second subassembly having a plurality of shakers superposed and spaced in a vertical direction; and
a first vertical oscillating drive shaft attached to said lower first subassembly so as to transmit an oscillating movement of said first vertical oscillating drive shaft to said lower first subassembly;
a second vertical oscillating drive shaft attached to said upper second subassembly so as to transmit an oscillating movement of said second vertical oscillating drive shaft to said upper second subassembly.

2. The harvesting head apparatus of claim 1, said plurality of shakers being flexible bars that are fastened at respective ends thereof to a pair of vertical shafts, at least one of said vertical shafts being the drive shaft, the harvesting head apparatus further comprising:
a shaking controller cooperative with each of said first and second oscillating drive shafts so as to independently impart oscillating movement to said plurality of shakers.

3. The harvesting head apparatus of claim 2, said shaking controller comprising a rotary shaft having a pair of eccentrics mounted thereon, one of said pair of eccentrics being linked through a first connecting rod to a first pivoting assembly fixed to said second vertical oscillating drive shaft, said first pivoting assembly being linked by a second connecting rod to a second pivoting assembly fixed to said first vertical oscillating drive shaft.

4. A harvesting machine for harvesting small fruit produced in fruit-bearing arboriculture, the harvesting machine having a direction of forward movement during harvesting, the harvesting machine comprising:
a harvesting head comprising:
a first shaking assembly;
a second shaking assembly mounted opposite to said first shaking assembly and separated by a vertical space, each of said first and second shaking assemblies comprising:

a lower first subassembly;

an upper second subassembly offset rearwardly of said lower first subassembly relative to the direction of forward movement, each of said lower first subassembly and said upper second subassembly having a plurality of shakers superposed and spaced in a vertical direction; and a first vertical oscillating drive shaft attached to said lower first subassembly so as to transmit an oscillating movement of said first vertical oscillating drive shaft to said lower first subassembly;

a second vertical oscillating drive shaft attached to said upper second subassembly so as to transmit an oscillating movement of said second vertical oscillating drive shaft to said upper second subassembly.

5. The harvesting machine of claim 4, said plurality of shakers being flexible bars that are fastened at respective ends thereof to a pair of vertical shafts, at least one of said vertical shafts being the drive shaft, the harvesting head apparatus further comprising:

a shaking controller cooperative with each of said first and second oscillating drive shaft so as to independently impart oscillating movement to said plurality of shakers.

6. The harvesting machine of claim 4, said shaking controller comprising a rotary shafts having a pair of eccentrics mounted thereon, one of said pair of eccentrics being linked through a first connecting rod to a first pivoting assembly fixed to said second vertical oscillating drive shaft, said first pivoting assembly being linked by a second connecting rod to a second pivoting assembly fixed to said first vertical oscillating drive shaft.

* * * * *